（12） United States Patent
Anderson et al.

(10) Patent No.: US 8,757,509 B2
(45) Date of Patent: Jun. 24, 2014

(54) BOILER CONTROL METHODS

(75) Inventors: Peter Anderson, St. Paul, MN (US);
Richard Simons, Golden Valley, MN
(US); Henry Troost, River Falls, WI
(US); Emil Costea, Minneapolis, MN
(US)

(73) Assignee: Honeywell International Inc.,
Morristown, NJ (US)

( * ) Notice: Subject to any disclaimer, the term of this
patent is extended or adjusted under 35
U.S.C. 154(b) by 1489 days.

(21) Appl. No.: 12/413,032

(22) Filed: Mar. 27, 2009

(65) Prior Publication Data
US 2010/0248176 A1    Sep. 30, 2010

(51) Int. Cl.
*F24H 9/20*    (2006.01)
(52) U.S. Cl.
USPC .......... 237/2 A; 122/14.1; 122/14.2; 122/446;
122/504; 237/2 R; 237/70; 237/71
(58) Field of Classification Search
USPC ............... 122/13.01, 14.1–14.22, 446, 448.1,
122/451.1, 458, 504; 237/2 A, 2 R, 70–71
See application file for complete search history.

(56) References Cited

U.S. PATENT DOCUMENTS

| | | | |
|---|---|---|---|
| 3,686,452 A | 8/1972 | Opiela | |
| 3,831,429 A | 8/1974 | Kmiecik | |
| 4,027,172 A | 5/1977 | Hamelink | |
| 4,084,547 A | 4/1978 | Deziel | |
| 4,251,028 A | 2/1981 | Nicolai et al. | |
| 4,259,982 A | 4/1981 | Bartels | |
| 4,290,551 A * | 9/1981 | Johnstone | 236/9 R |
| 4,347,972 A | 9/1982 | Hillerstrom et al. | |
| 4,360,738 A | 11/1982 | Bartels | |
| 4,445,638 A | 5/1984 | Connell et al. | |
| 4,497,438 A | 2/1985 | Bonne | |
| 4,513,909 A | 4/1985 | Bartels | |
| 4,513,910 A | 4/1985 | Bartels | |
| 4,564,141 A | 1/1986 | Montgomery et al. | |
| 4,565,930 A | 1/1986 | Bartels | |
| 4,834,284 A * | 5/1989 | Vandermeyden | 236/20 R |
| 4,844,335 A | 7/1989 | McKinley et al. | |
| 4,941,435 A | 7/1990 | Person | |
| 5,056,714 A * | 10/1991 | Cohen | 237/9 R |
| 5,325,286 A * | 6/1994 | Weng et al. | 700/12 |
| 5,692,676 A * | 12/1997 | Walker | 237/8 R |
| 5,779,143 A * | 7/1998 | Michaud et al. | 237/8 R |
| 6,536,678 B2 * | 3/2003 | Pouchak | 237/7 |
| 6,577,817 B2 * | 6/2003 | Harris | 392/481 |
| 6,745,085 B2 | 6/2004 | Pouchak | |
| 6,818,867 B2 * | 11/2004 | Kressmann | 219/441 |
| 6,904,874 B1 | 6/2005 | Pouchak et al. | |
| 7,243,540 B2 | 7/2007 | Merwin | |
| 7,409,301 B2 | 8/2008 | Tynkov | |
| 7,434,544 B2 * | 10/2008 | Donnelly et al. | 122/14.22 |
| 7,593,789 B2 * | 9/2009 | Gougerot et al. | 700/275 |
| 7,798,107 B2 * | 9/2010 | Chian et al. | 122/14.22 |
| 7,913,927 B2 * | 3/2011 | Sambrook | 236/46 E |
| 2002/0170501 A1 * | 11/2002 | Davis | 122/13.01 |
| 2004/0103854 A1 * | 6/2004 | Cui et al. | 122/18.1 |
| 2004/0177817 A1 * | 9/2004 | Bradenbaugh | 122/13.01 |
| 2008/0312774 A1 * | 12/2008 | Zhang et al. | 700/300 |
| 2009/0159017 A1 * | 6/2009 | Tsuge | 122/14.1 |

* cited by examiner

*Primary Examiner* — Steven B McAllister
*Assistant Examiner* — Ko-Wei Lin
(74) *Attorney, Agent, or Firm* — Seager Tufte Wickhem LLC

(57) ABSTRACT

A method for controlling a boiler includes firing a boiler, and monitoring a temperature deviation between a boiler temperature and a heating temperature profile over time. If the temperature deviation exceeds an allowable deviation, the boiler is shut off.

21 Claims, 10 Drawing Sheets

BOILER CONTROL METHODS

TECHNICAL FIELD

The disclosure relates generally to boilers, and more particularly to control methods and systems for boilers.

BACKGROUND

Boilers are commonly used in hydronic or other heating systems in residential, institutional, and commercial buildings, as well as in other applications. Typically, in a boiler system, a fuel burner produces heat that is transferred via a heat exchanger to water, which is circulated to transport the heat to end-use locations. In some cases, damage or injury may result if the boiler is fired when the water level is low, if a water valve is stuck, if a water circulation pump fails and/or if some other irregularity in operation or maintenance occurs. Some boiler systems include a low water sensing mechanism, such as a probe or float to monitor the water level in the boiler. Such a sensing mechanism generally requires additional inputs to the boiler controller, wiring to connect the sensor and controller, and in some cases, an additional hole or holes in the heat exchanger for the sensor. Some boiler systems include additional sensors to detect when a water valve might be stuck, when a water circulation pump fails and/or if some other irregularity occurs. All of this, however, can add significant complexity and cost to the system, and in some cases, may introduce additional vulnerabilities to the system.

SUMMARY

The disclosure relates generally to boilers, and more particularly to control methods and systems for boilers. In an illustrative but non-limiting example, the disclosure provides a method for controlling a boiler. In the method, a boiler is fired, and over time, a temperature deviation between a boiler temperature and a heating temperature profile is monitored. If the temperature deviation exceeds an allowable deviation, the boiler is shut off.

In another illustrative, non-limiting example, the disclosure provides another method for controlling a boiler. A boiler is fired, and over time, a temperature difference between a first boiler temperature and a second boiler temperature is monitored. The first and second boiler temperatures are monitored by sensors at different boiler locations. If the temperature difference exceeds a selected difference, the boiler is shut off.

In yet another illustrative, non-limiting example, the disclosure provides a boiler system. The boiler system includes a boiler, a sensor for sensing a boiler temperature of the boiler, and a controller for controlling firing of the boiler. The controller is configured to compare the boiler temperature with a heating temperature profile over time. If a temperature deviation between the boiler temperature and the heating temperature profile exceeds an allowable deviation, the controller is configured to shut off the boiler.

The above summary is not intended to describe each and every disclosed embodiment or every implementation of the disclosure. The Description that follows more particularly exemplify the various illustrative embodiments.

BRIEF DESCRIPTION OF THE FIGURES

The following description should be read with reference to the drawings. The drawings, which are not necessarily to scale, depict selected embodiments and are not intended to limit the scope of the disclosure. The disclosure may be more completely understood in consideration of the following detailed description of various embodiments in connection with the accompanying drawings, in which.

DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

Figure 1:
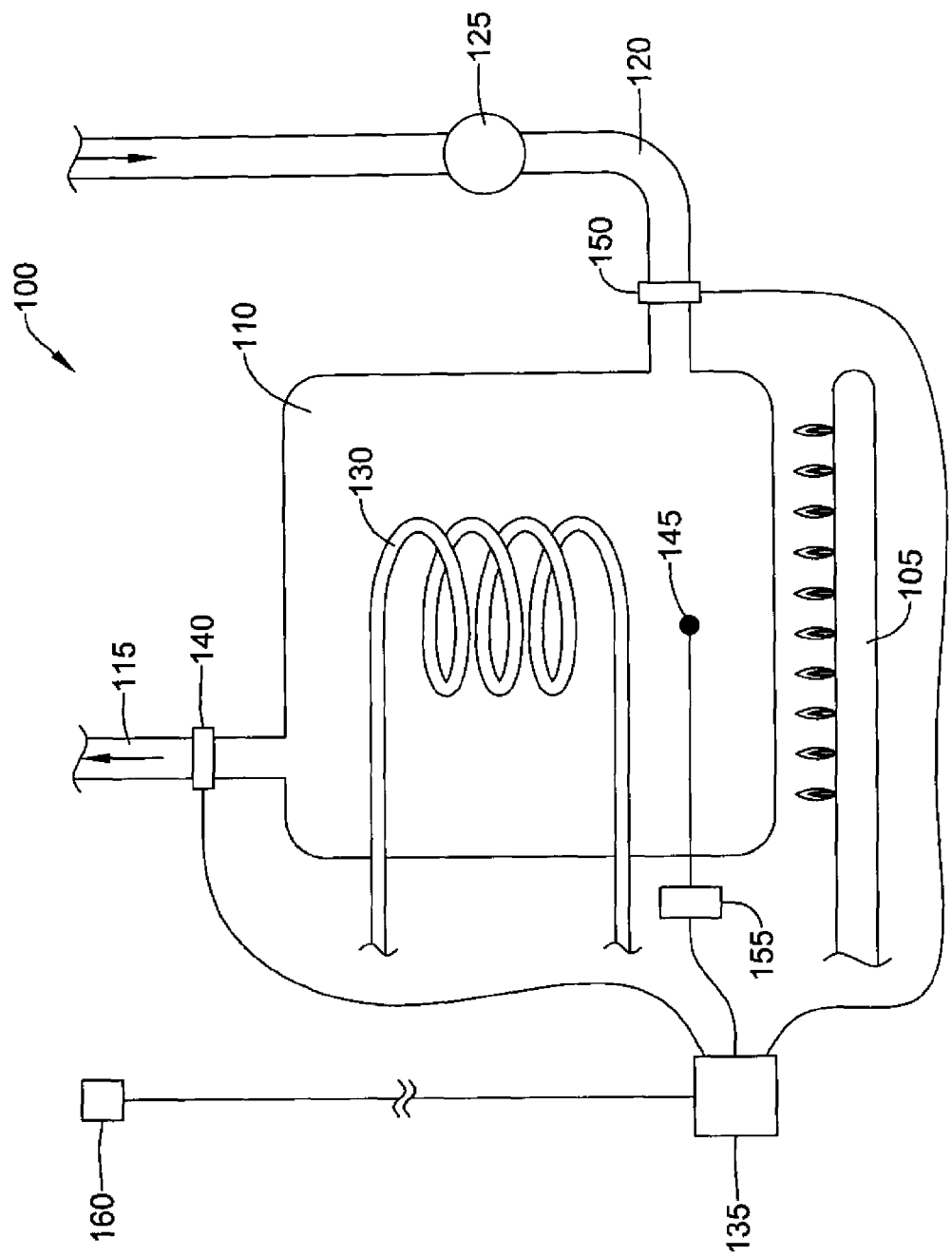
FIG. 1 is a schematic diagram of an illustrative boiler system.

FIG. 1 is a schematic diagram of an illustrative boiler system 100. The illustrative boiler system 100 includes a burner 105 which may combust oil, natural gas, propane or any other suitable fuel. In some cases, burner 105 may be a resistive heating element or any other suitable heat source, as desired. The illustrative boiler system 100 also includes a heat exchanger 110 connected to a water outlet 115 and a water return inlet 120. While the illustrative boiler system 100 is depicted as using water as a heat transporting fluid, it is contemplated that any suitable fluid (or gas) may be used, as desired. In FIG. 1, a circulator 125 is shown to pump or otherwise create circulation of water through the boiler system 100. In some cases, the boiler system 100 may be connected to or include a hydronic heating system (not shown), a Domestic Hot Water (DHW) coil 130, or any other suitable heating system, as desired.

The illustrative boiler system 100 may be at least partially controlled by a controller 135. The controller 135 may, for example, control the firing of the burner 105 (which also may be referred-to as the firing of the boiler) and/or the firing rate of the burner 105. In some cases, the controller 135 may be configured to execute a control algorithm that references periodic, instantaneous and/or historical boiler performance data. In some cases, the controller 135 may receive boiler performance data from one or more sensors, such as temperature, flow, pressure and/or other sensors, depending on the particular boiler system. In FIG. 1, the illustrative boiler system 100 may include one or more boiler temperature sensors 140, 145, and 150. As illustrated, temperature sensor 140 may measure a boiler temperature proximate to the water outlet 115. Temperature sensor 145 is shown in the interior of the heat exchanger 110, sometimes proximate to a domestic hot water coil 130 when provided, and sometimes in communication with an Aquastat 155. Temperature sensor 150 may measure a boiler temperature proximate to the water return 120. In some cases, a thermostat 160 may provide information to the controller 135, such as a call for heat from an enclosed space that is to be temperature controlled by the boiler 110. As further disclosed herein, the controller 135 may compare one or more sensed boiler temperatures with one or more heating temperature profiles over time, and in response, fire or shut down the burner 105 as appropriate.

During normal operation, the water in the boiler 110 may follow a predictable, expected heating temperature profile of boiler temperature vs. time over the duration of a burner firing cycle. However, a number of factors may cause the actual temperature at a particular time to deviate from the expected value of a heating temperature profile. It may be that one or more of a number of variables of boiler system operation, such as (but not limited to) the load on the system, is different than expected, but within the bounds of normal operation. In such a case, an actual measured temperature rise profile may follow a path different than an expected heating temperature profile, but the actual temperature profile may still fall within an acceptable range of temperature profiles. Alternately, the actual temperature may deviate from the expected value of a heating temperature profile owing to an unforeseen and/or anomalous condition, such as low water in the boiler, a failed circulator pump, a stuck zone valve, or the like. Such a condition may result in a failure of the system to accomplish its goals, damage to the boiler, or even injury.

Figure 2:
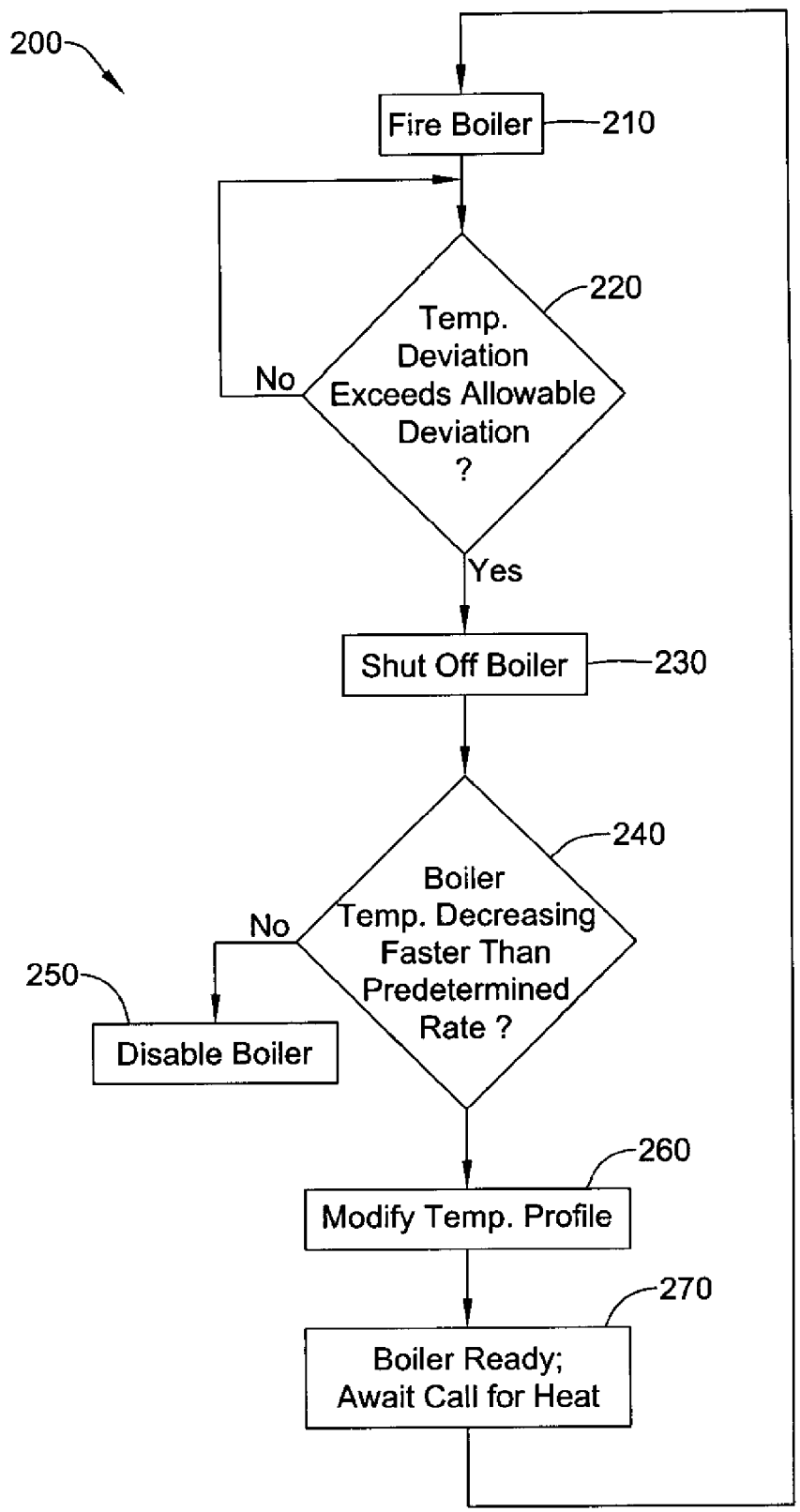
FIG. 2 is a flowchart showing an illustrative method for controlling a boiler system.

In one illustrative embodiment, boiler control methods and systems are provided that include measuring heating and/or cooling temperatures of the boiler to detect faults in boiler operation. FIG. 2 is a flowchart showing an illustrative method 200 for controlling a boiler system. The boiler system may be like boiler system 100 of FIG. 1, or it may be any other suitable boiler system, as desired. Initially, the boiler is fired as shown at 210. Then, over time, a controller monitors the boiler temperature, which may be measured by, for example, a temperature sensor such one or more of those illustrated in FIG. 1. Performance of the control system may vary depending on the temperature sensor used, and different advantages may be realized with different boiler temperature sensors and sensor placement. For example, a sensor such as sensor 145 connected to Aquastat 155 may already be required for boiler control, and thus need not be separately provided to practice some or all of the methods described herein. Alternatively, or in addition, sensor 140 may be attached to the exterior of a water outlet pipe 115, and not internal to the heat exchanger 110, simplifying installation. It is contemplated that any suitable temperature sensor and sensor location may be used, depending on the application.

The measured boiler temperature versus time is compared with a heating temperature profile at block 220. The heating temperature profile may be provided by any suitable method. It may, for example, be preprogrammed by the boiler system manufacturer, provided by an HVAC installer, entered by an end-user, or generated, modified, or otherwise obtained by the boiler controller. At any given time, the amount by which the boiler temperature is higher than the temperature at a corresponding time of the heating temperature profile may be considered a temperature deviation. If the temperature deviation exceeds an allowable deviation, which may be any suitable value, such as 3° F., 5° F., 10° F., 20° F. etc., the controller may shut off the burner of the boiler, as shown at block 230. Referring back to block 220, if the temperature deviation remains within the allowable deviation range (i.e., less than the allowable deviation), then the controller may continue to measure the deviation as long as the burner remains firing (e.g., as long as there is a call for heat).

Figure 3:
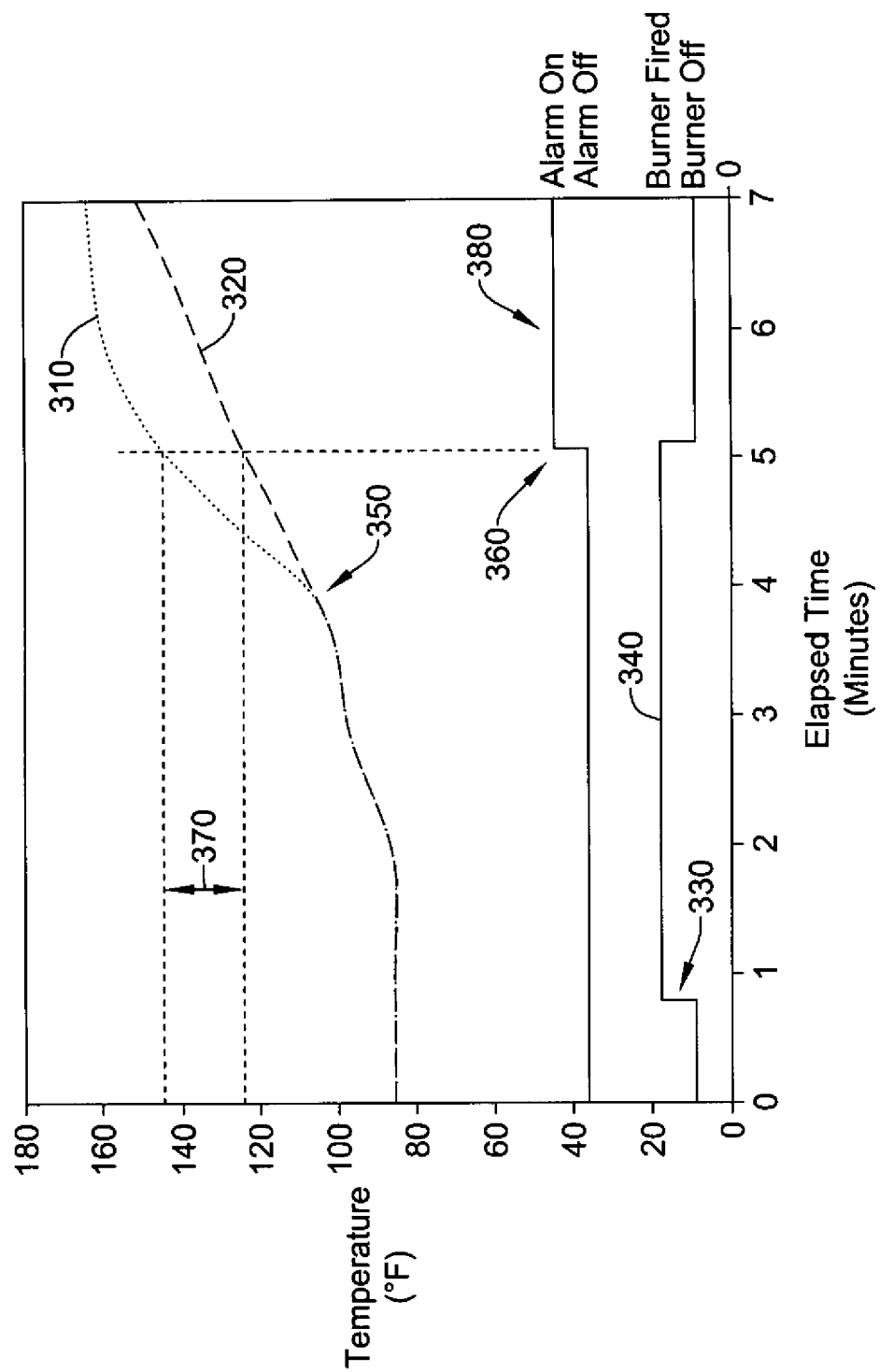
FIG. 3 is a graph showing an illustrative method for controlling a boiler system.

Referring briefly to FIG. 3, which illustrates some aspects of the method of FIG. 2 described thus far. Trace 310 of FIG. 3 represents an actual measured temperature rise profile generated from a series of measured boiler temperatures. Trace 320 represents a heating temperature profile. In some cases, the heating temperature profile may coincide with the actual measured temperature rise profile 310 generated from the series of measured boiler temperatures, but may be clipped or otherwise limited by the controller to have a maximum temperature rise slew rate (e.g. 15° F./minute). At time 330, the boiler is fired, as indicated by trace 340 representing the firing state of the burner. In FIG. 3, initially after the boiler is fired, the measured boiler temperature tracks closely (if not exactly) with the heating temperature profile, illustrated by traces 310 and 320 staying close together. However, at time 350, traces 310 and 320 diverge, showing that the actual measured boiler temperature is rising more rapidly than the heating temperature profile, resulting in a growing temperature deviation. At time 360, the temperature deviation, indicated by 370, exceeds an allowable deviation of 20° F. in this example. Such a situation also may be referred-to as an excess temperature deviation. As a result, the controller may shut off the burner of the boiler, as indicated by trace 340, and optionally, an alarm may be annunciated, as indicated by trace 380.

Referring back to FIG. 2, and after the boiler is shut off, the control method may continue to monitor the boiler temperature, as shown at block 240. With the burner of the boiler 100 shut off, the water circulator 125 may continue to be energized. If the circulator 125 is able to keep water in circulation, heat may be transported from the boiler 100, and the boiler temperature may decrease. If the boiler temperature decreases faster than a predetermined rate, as described further herein, it may be indicative of a small heating zone or an oversized boiler, which may not be a potentially serious fault such as a low water condition, failed circulator pump, stuck zone valve, or the like. In the case of such a more serious fault, the monitored boiler temperature may continue to increase, may remain essentially constant, or may not decrease faster than a predetermined rate. When this occurs, the boiler may be disabled, as shown at block 250. Subsequent to disablement, the boiler may remain disabled, or a control protocol may allow re-enablement of the boiler after the boiler temperature decreases below a selected limit, as further described below.

Ascertaining whether the boiler temperature is decreasing faster than a predetermined rate may be performed by any suitable method. In one illustrative embodiment, the boiler temperature may be checked at a predetermined time interval after the burner is shut off, and compared to the boiler temperature immediately following burner shut off. If the temperature has dropped more than a predetermined amount after the predetermined time interval, which together may define a predetermined rate, then the boiler temperature may be considered to have decreased faster than the predetermined rate. In another illustrative embodiment, the measured boiler temperature may be compared to a cooling temperature profile, and if the boiler temperature is lower than a temperature of the cooling temperature profile at a time after the burner has been shut down, the boiler temperature may be considered to be decreasing faster than a predetermined rate.

After determining that the boiler temperature is decreasing faster than a predetermined rate, boiler control method 200 proceeds to block 260, which modifies the heating temperature profile. If the heating temperature profile were not modified, then the boiler control method 200 would likely result in repeated boiler shut off due to excessive temperature deviation between the boiler temperature and the heating temperature profile. However, the decrease of boiler temperature faster than the predetermined rate suggested that the excess temperature deviation likely did not occur because of a serious fault, but rather because of a situation such as low load on the boiler. In this case, the boiler shut off may be considered a nuisance shut off, and the heating temperature profile may be modified to attempt to avoid repeated nuisance shut offs. Generally, the modification of the heating temperature profile may be such that a higher rate of boiler temperature increase is allowed without boiler shut off being commanded. After modification of the heating temperature profile, the boiler system may return to a ready state, as shown at block 270, and the alarm, if annunciated previously, may be quenched. Following this return to a ready state, the boiler's burner may fire immediately at block 210 if there is a continued call for heat. Otherwise, the ready boiler may wait for a next call for heat before firing at block 210.

Figure 4:
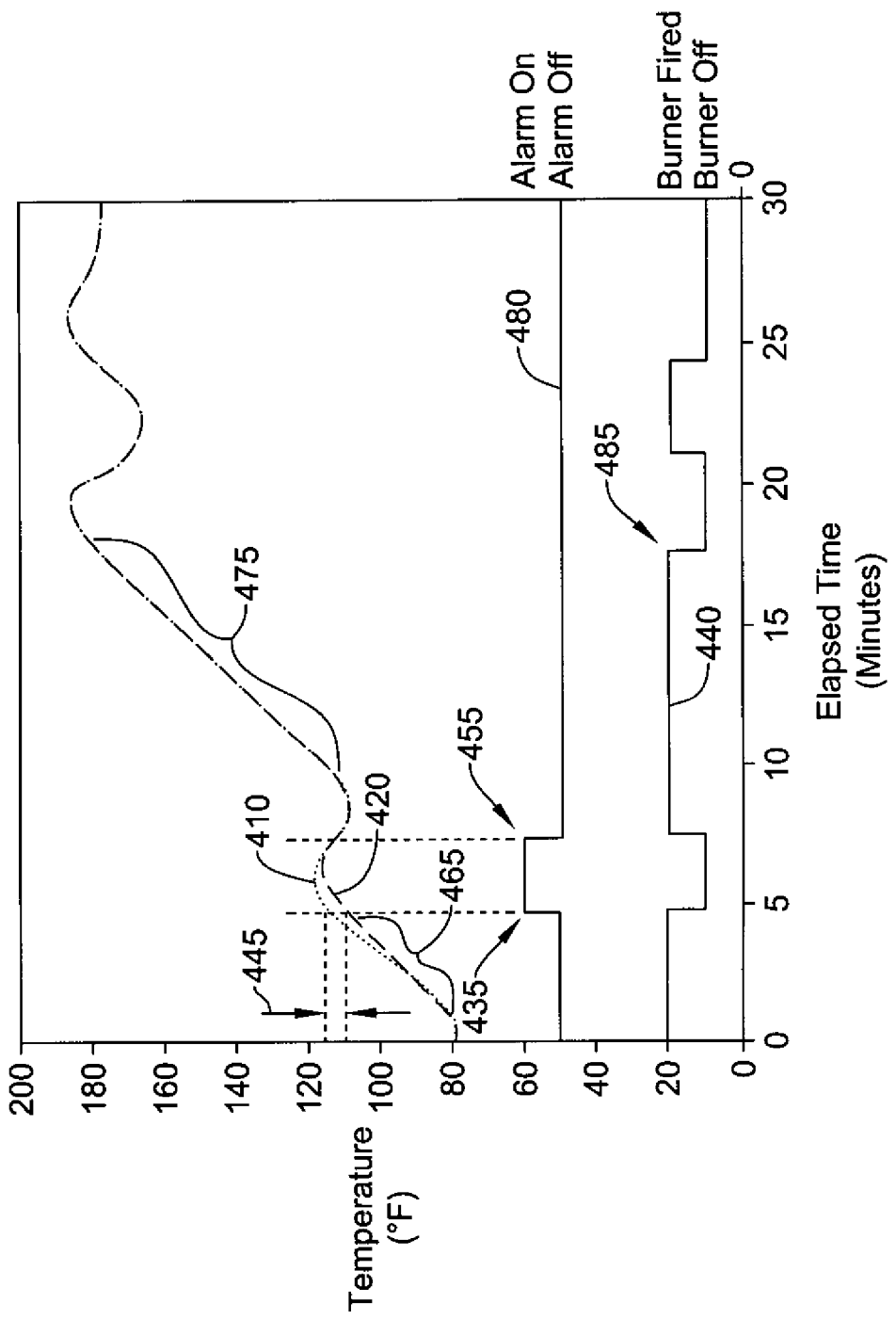
FIG. 4 is a graph showing an illustrative method for controlling a boiler system, including modification of a heating temperature profile.

FIG. 4 is graph illustrating modification of the heating temperature profile. Aspects of this graph are presented similarly to that of FIG. 3, with some similar features sharing similar reference numerals. At time t=0, the boiler is fired. At time 5 minutes, temperature deviation 445 exceeds an allowable temperature deviation, and the burner is shut off, and optionally, an alarm is annunciated as shown at 435.

Following shut off of the boiler (e.g. 5 minutes in FIG. 4), the temperature deviation between the actual measured temperature rise profile 410 and heating temperature profile 420 is seen to decrease. By time 455, the controller determines that the boiler temperature has decreased faster than a predetermined rate. As such, and in the illustrative embodiment, the controller modifies the original heating temperature profile 420 to reflect an increased maximum temperature rise slew rate (e.g. 10° F./minute). The burner is then re-fired as shown at 440 and the alarm 455 is quenched. Determination that the boiler temperature has decreased faster than a predetermined rate may be made according to any suitable criteria, as further discussed herein.

The modification of the heating temperature profile may allow for a higher rate of boiler temperature increase without shutting down the burner. One such way is to increase the maximum temperature rise slew rate of the heating temperature profile, as described above. In FIG. 4, heating temperature profile 420 includes a section 465 with a slew rate of approximately 8° F./minute. After modification, the heating temperature profile 420 includes a section 475 with a slew rate of approximately 10° F./minute. Following this modification, the actual measured temperature rise profile 410 of this example is seen to track closely with the modified heating temperature profile 420. In particular, the temperature deviation after modification remains within the allowable deviation, and the burner remains fired until the controller commands the burner to turn off at 485 after completing the heating cycle. While the maximum temperature rise slew rate show in FIG. 4 as a linear rate of change of temperature versus time, it is contemplated that maximum temperature rise slew rate may be linear, piecewise linear, non-linear or any other suitable function or curve, as desired.

Figure 5:
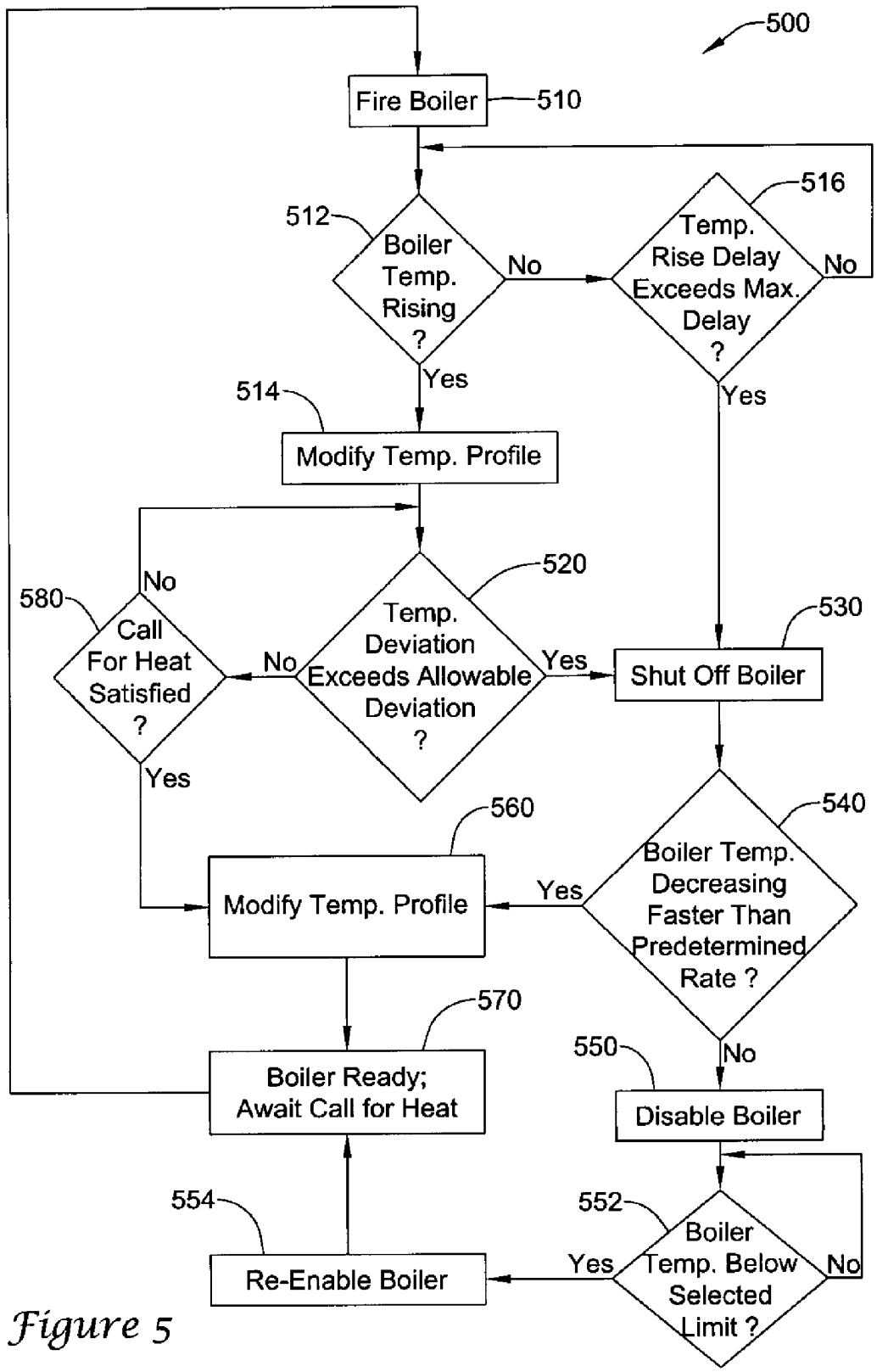
FIG. 5 is a flowchart showing an illustrative method for controlling a boiler system.

The present disclosure further provides extensions and/or alternatives to the method for controlling a boiler system illustrated in FIG. 2. For example, FIG. 5 is a flowchart showing another illustrative method 500. The method of FIG. 5 includes additional provisions for modifying the heating temperature profile, and an additional provision for shutting off the boiler. Various aspects of boiler control methods are represented together in method 500 of FIG. 5 for convenience and to illustrate how they may interact with each other. However, it should be recognized that not all elements of method 500 need be present in a boiler control method or system. Any suitable combination of elements may be employed, depending on the application.

In the illustrative boiler control method 500 of FIG. 5, the boiler is fired as shown at 510. Similar to the method 200 of FIG. 2, a controller monitors the boiler temperature over time, and at block 520, the measured boiler temperature is compared with a heating temperature profile. Before arriving at block 520, however, the method 500 includes another feature that accounts for another temperature rise profile characteristic that may help discriminate between normal and anomalous boiler system behavior. In both normal and anomalous cases, the heat exchanger temperature may rise significantly before a temperature rise is detected in circulating water, as may, for example, be detected by a temperature sensor such as sensor 140 located on the water outlet pipe 115 of the boiler system 100 of FIG. 1, or sensor 150 located on the water return pipe 120. In some high heating capacity boiler systems and/or boiler systems with low thermal mass, as well as in heavily loaded systems, the heat exchanger temperature may rise significantly before a water temperature rise is detected, and there may be a relatively long delay before the temperature of the circulating water rises. There may even be a period when the circulating water temperature drops before rising, depending, in some cases, on where the water temperature is sensed. When the water temperature eventually does begin rising, it may rise slowly, well under a maximum temperature rise slew rate of a nominal heating temperature profile. Such behavior of a boiler system may be normal and/or acceptable for a particular application.

In comparison, a boiler with no or little water circulation may also experience a relatively long delay before water temperature begins rising at the sensed location, but once the temperature starts to rise, it may rise relatively quickly, sometimes far above a nominal maximum temperature rise slew rate. If the boiler is low on water, these two characteristics may be exaggerated further, with an even longer delay and an even steeper temperature rise.

This explanation of the causes of a boiler temperature rise delay between when the boiler is fired and when a selected temperature rise in the boiler temperature is detected may be incorporated into method 500. For example, and at block 512, the system may be monitored for a threshold selected temperature rise in the boiler temperature over time. If the selected temperature rise is detected, an initial delay may be noted, and the method may pass to block 514. Block 514 may modify the heating temperature profile based upon the magnitude of the initial delay in water temperature rise. The heating temperature profile may, for example, include a relatively lower maximum temperature rise slew rate for a longer boiler temperature rise delay, or a relatively higher maximum temperature rise slew rate for a shorter boiler temperature rise delay. Method 500 may also include a provision for shutting the boiler off before a selected temperature rise is detected, if the boiler temperature rise delay exceeds a predetermined maximum delay. This feature is illustrated at block 516 of FIG. 5.

Figure 6:
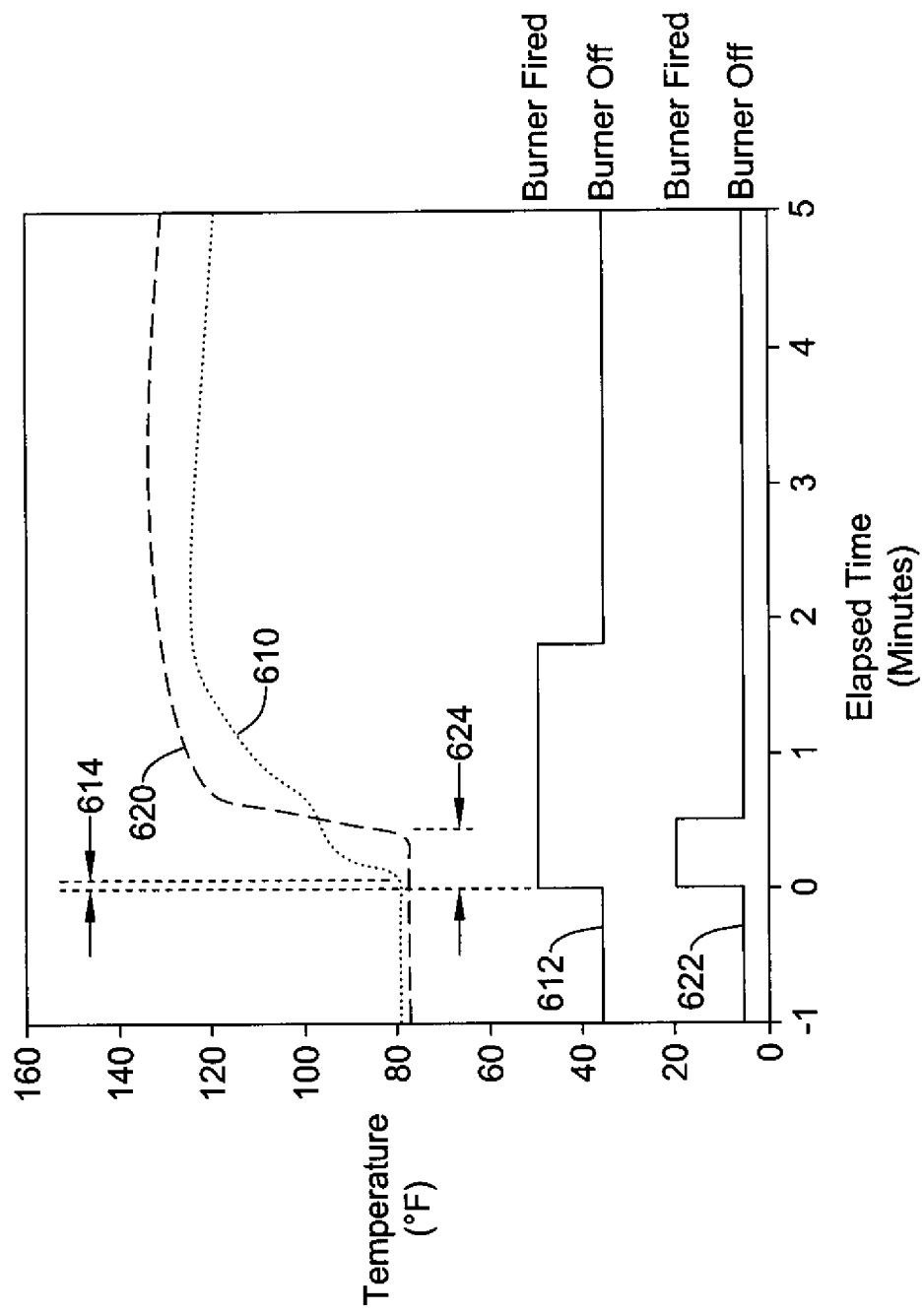
FIG. 6 is a graph showing temperature rise profiles that illustrate low thermal mass boiler operation with and without water circulation.

Referring briefly to FIG. 6, which is a graph showing temperature rise profiles that illustrate low thermal mass boiler operation with and without water circulation. Trace 610 represents the actual temperature rise profile for a low thermal mass boiler in normal operation, with water circulation. Trace 612 indicates the burner firing for this normally-operating boiler. After an acceptable boiler temperature rise delay 614, the boiler temperature rises at an acceptable rate.

Trace 620 represents a temperature rise profile for a low thermal mass boiler in abnormal operation without water circulation. Trace 622 indicates the burner firing for the abnormally-operating boiler. After an abnormally long boiler temperature rise delay 624, the boiler is shut off, and the boiler temperature, once it starts rising, ascends rapidly and is slow to cool after peaking.

Referring back to FIG. 5, after the possible modification of the heating temperature profile at block 514, boiler control method 500 may then proceed as shown at block 520 in a manner similar to that described for method 200 of FIG. 2. If the temperature deviation exceeds the allowable deviation, then the method proceeds to shut off the boiler at block 530, and the boiler temperature is monitored at block 540. As in method 200, if it is determined that the boiler temperature is decreasing faster than a predetermined rate, method 500 passes to block 560, where the heating temperature profile may be modified, possibly incorporating a higher maximum temperature rise slew rate, which may circumvent repeated nuisance shutoffs. The method then passes to block 570, where the boiler, again ready, awaits a call for heat, upon which it may be fired at block 510. If, at block 540, the boiler temperature is found not to be decreasing faster than a predetermined rate, the boiler may be disabled, as at block 550. The illustrative control method 500 may allow re-enablement of the boiler if appropriate criteria are satisfied. One such possibility is show in FIG. 5 at block 552, where, if boiler temperature decreases below a selected limit, the method 500 passes to block 554 where the boiler is re-enabled, then to block 570, where a call for heat is awaited.

In another option for boiler control methods, FIG. 5 illustrates one way in which a heating temperature profile may be modified in some exemplary methods without a prior boiler shut-off necessarily having been commanded as a consequence of a temperature deviation exceeding an allowable deviation. For example, and in one illustrative embodiment, a heating temperature profile may be modified after the boiler system has executed at least one complete heating cycle, where a complete heating cycle may be defined as a cycle in which the boiler fires until commanded to stop due to a call for heat having been satisfied, and not due to an excess temperature deviation. In the flowchart of FIG. 5, such a situation exists when proceeding from block 520 (temperature deviation within allowable deviation) to block 580 (check to determine whether the call for heat has been satisfied) to block 560. In this case, the heating temperature profile may be modified at block 560 such that it conforms more closely to at least one actual measured temperature rise profile of the boiler. In some cases, such modification may result in a maximum temperature rise slew rate of the heating temperature profile being just above the maximum expected slew rate as anticipated from one or more actual measured temperature rise profiles. Such dynamic modification to the heating temperature profile may be performed based upon only the most recent actual measured temperature rise profile, or multiple past actual measured temperature rise profiles. In some embodiments, a controller may be configured to store boiler performance history, including actual measured temperature rise profiles. Any suitable method may be used to dynamically modify the heating temperature profile based upon one or more actual measured temperature rise profiles, as desired.

In some embodiments, the value of the allowable deviation may be dynamically modified over time. The allowable deviation may be decreased or increased. In some embodiments, the allowable deviation may be modified in conjunction with modification of the heating temperature profile. For example, in some cases, as the controller modifies the heating temperature profile to more precisely match actual temperature rise profiles, the allowable deviation may be decreased, as the boiler system may be expected to more closely track the modified heating temperature profile during subsequent heating cycles. A smaller allowable deviation may then make it possible to detect a fault in the boiler system more quickly when it occurs.

Methods and systems of the present disclosure may further include methods to accommodate additional variations in boiler systems. In boiler systems that include a domestic hot water (DHW) coil, an Aquastat temperature sensor is often located near the coil, such as sensor 145 of the boiler system 100 of FIG. 1, or may even be surrounded by the coil. On a DHW draw, such a sensor will often be locally cooled, while the heat exchanger may remain hot sometimes at a higher temperature than would be indicated by the temperature sensor. The proper operation of the boiler as described with a small load may mimic in some aspects that of a boiler operating abnormally on low water. Additional temperature sensors may provide more information to a controller about the boiler's condition and lessen ambiguity. For example, a sensor placed on or in proximity to the water outlet pipe such as sensor 140 in FIG. 1. Alternatively, or in addition, a sensor placed on or in proximity to the water return pipe such as sensor 150 in FIG. 1. Using this additional temperature information, a controller may readily determine whether the boiler is operating normally or with low water and/or reduced circulation.

Figure 7:
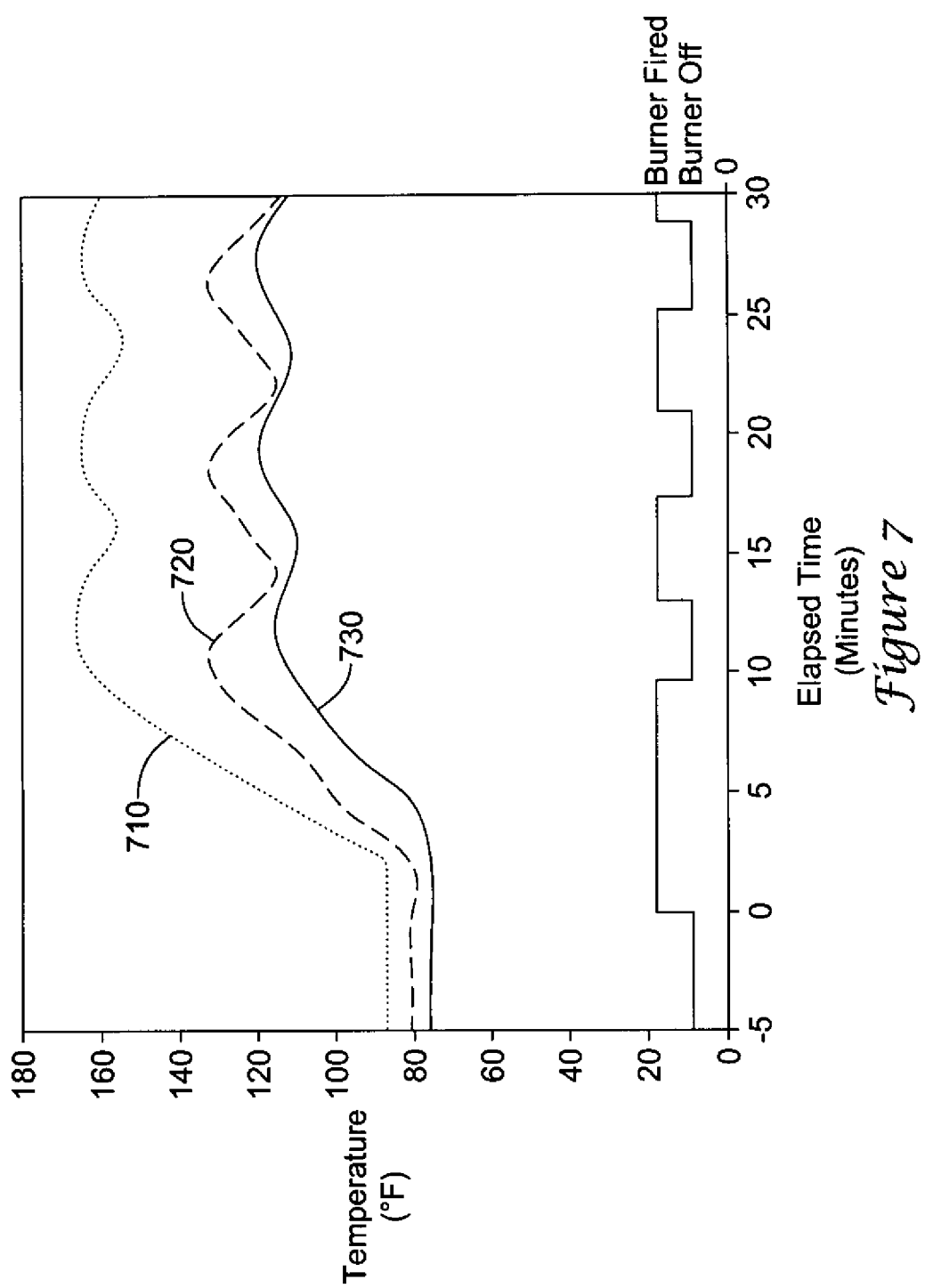
FIG. 7 is a graph showing typical behavior of a boiler system that includes a domestic hot water coil.
Figure 8:
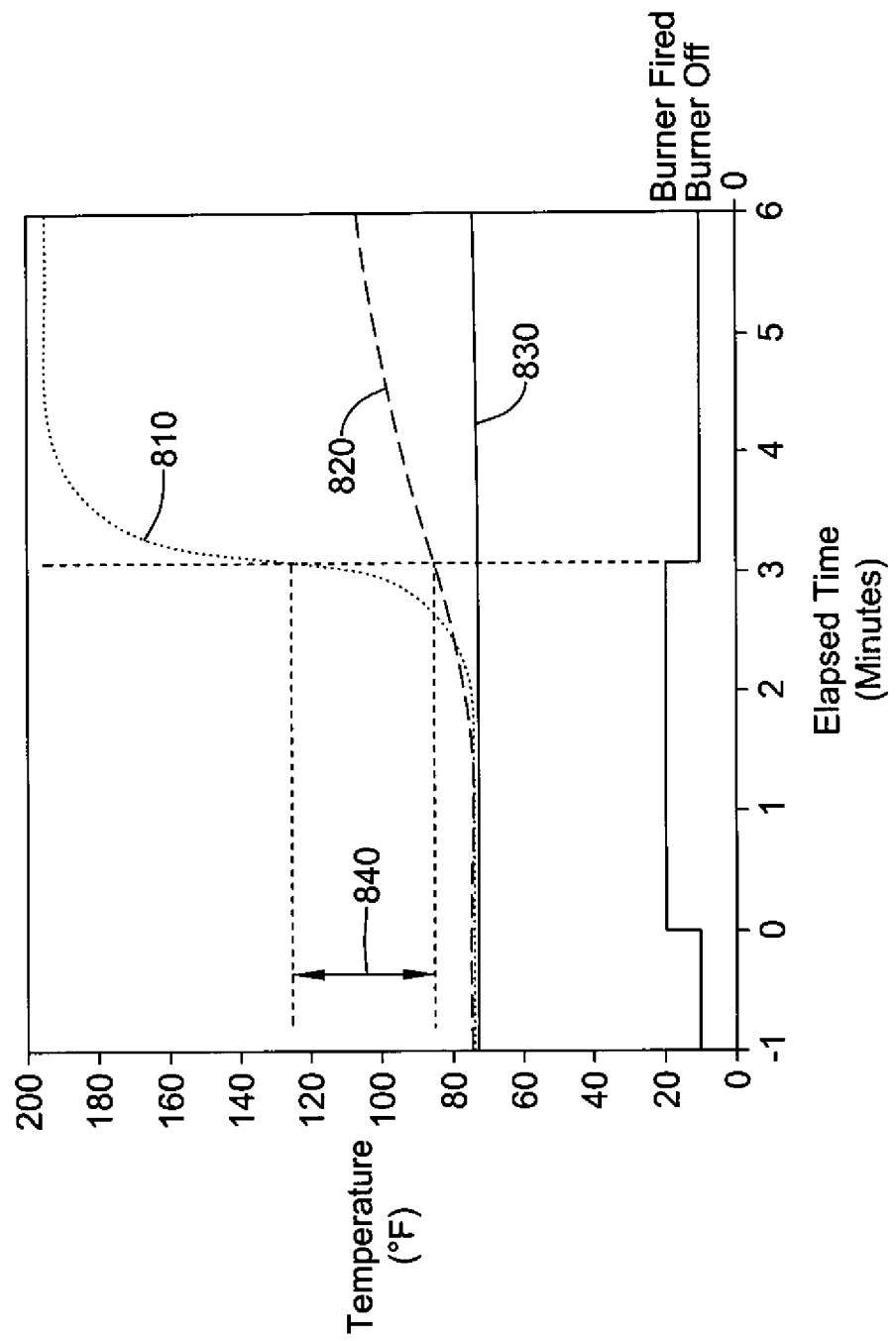
FIG. 8 is a graph showing typical behavior of a boiler system that includes a domestic hot water coil under low water conditions.

Under normal operation, the temperature monitored at the water outlet will generally track the Aquastat temperature. The outlet temperature may be greater than the Aquastat temperature, but generally not excessively so, and the temperatures may generally rise and fall in a similar manner. FIG. 7 is a graph showing typical behavior of a boiler system that includes a domestic hot water coil. Trace 710, 720, and 730 represent temperatures measured near the water outlet, domestic hot water coil (e.g. Aquastat sensor), and water return, respectively, of a boiler system as the burner cycles in response to DHW demand. Generally, the three temperature traces are seen to follow the burner cycles. In contrast, FIG. 8 shows the corresponding temperatures profiles 810, 820 and 830 under low water conditions. Once the outlet temperature 810 begins to deviate substantially from the Aquastat temperature as indicated at 840, the burner may be shut off. After shut off, the temperatures may continue to be monitored. In this example, the outlet temperature continues to rise for a time even when the burner remains off.

Figure 9:
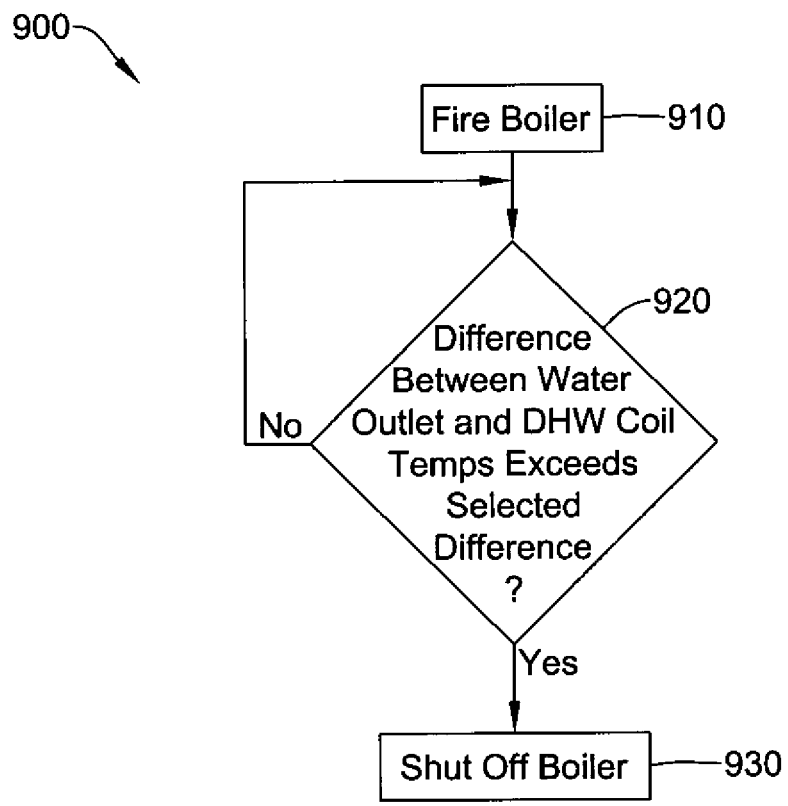
FIG. 9 is a flowchart showing an illustrative method for controlling a boiler system.

FIG. 9 is a flowchart showing an illustrative method for controlling a boiler system. After firing a boiler at block 910, boiler temperatures are monitored at different locations, such as proximate a water outlet and at or near a DHW coil. In some embodiments, other temperature monitoring locations may be selected. At block 920, the difference between the water outlet and DHW coil temperatures are monitored, and if the temperature difference exceeds a selected difference, the boiler is shut off at block 930. In some embodiments, the controller may apply boiler shut-off criteria that take additional information into account, such as the rate at which the two temperatures are diverging, or any other suitable criteria. In some embodiments, a temperature deviation between a boiler temperature and a heating temperature profile may be monitored and the boiler may be shut off if the temperature deviation exceeds a maximum allowable deviation. In some embodiments, after boiler shut off, the method may provide for monitoring boiler temperatures and re-enabling the boiler if appropriate criteria are met.

Figure 10:
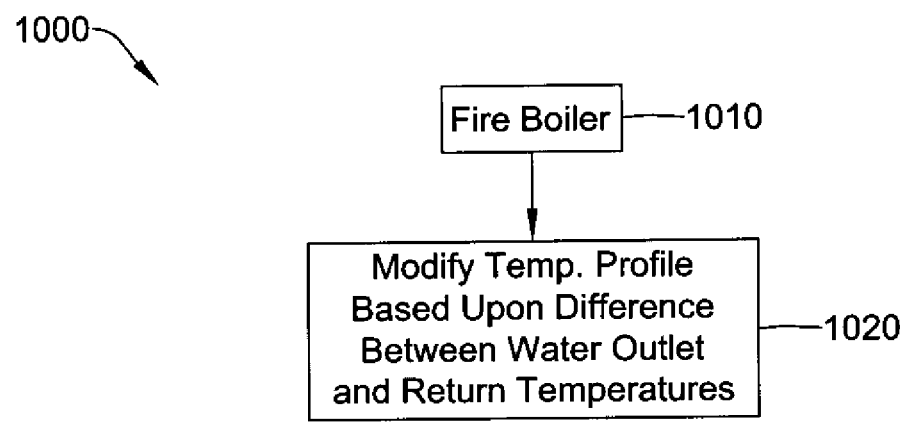
FIG. 10 is a flowchart showing an illustrative method for controlling a boiler system.

Multiple boiler temperature sensors may make addition functions possible. For example, a controller may compare water outlet and return temperatures and calculate the temperature rise across the heat exchanger. The controller may then estimate the system load based upon this temperature difference and modify a heating temperature profile accordingly. FIG. 10 is a flowchart showing such an illustrative method 1000. In FIG. 10, a boiler is fired at 1010, and control is passed to block 1020. Block 1020 modifies a heating temperature profile based upon a temperature difference between the water outlet temperature and return temperature. In some cases, if the actual temperature at the water outlet exceeds the heating temperature profile during a heating cycle, the boiler may be shut down as described above.

The disclosure should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A method for controlling a boiler configured to provide a heated boiler fluid for heating a space of a building that is to be temperature controlled by the boiler, wherein the boiler including a burner, the method comprising:
receiving a call for heat that is based on an air temperature sensed in the space of the building;
firing the burner based on the call for heat;
with the burner firing, monitoring over time a temperature deviation between a temperature of the boiler fluid of the boiler and a heating temperature profile, and if the temperature deviation exceeds an allowable deviation, shutting off the burner; and
wherein the heating temperature profile represents an expected temperature response of the temperature of the boiler fluid over time to the burner firing; and
subsequent to shutting off the burner, monitoring the temperature of the boiler fluid over time.

2. The method of claim 1, further comprising:
subsequent to shutting off the burner:
determining if the temperature of the boiler fluid decreases faster than a predetermined rate;
if the temperature of the boiler fluid decreases faster than the predetermined rate:
modifying the heating temperature profile; and
returning the boiler to a ready state, wherein in the ready state, the burner is allowed to fire based on the call for heat or a subsequent call for heat.

3. The method of claim 2, wherein the heating temperature profile includes a maximum temperature rise slew rate, and the step of modifying the heating temperature profile including increasing the maximum temperature rise slew rate.

4. The method of claim 1, further comprising:
subsequent to shutting off the burner:
determining if the temperature of the boiler fluid decreases faster than a predetermined rate; and
if the temperature of the boiler fluid does not decrease faster than the predetermined rate, disabling the boiler.

5. The method of claim 4, further comprising:
subsequent to disabling the boiler, re-enabling the boiler after the temperature of the boiler fluid decreases below a limit.

6. The method of claim 1, wherein if the temperature deviation does not exceed the allowable deviation, the method further comprises modifying the heating temperature profile based upon at least one actual measured temperature rise profile of the temperature of the boiler fluid.

7. The method of claim 6, wherein the heating temperature profile includes a maximum temperature rise slew rate, and the step of modifying the heating temperature profile includes decreasing the maximum temperature rise slew rate based upon a measured slew rate of at least one actual measured temperature rise profile of the temperature of the boiler fluid.

8. The method of claim 1, further comprising:
measuring a boiler temperature rise delay between when the burner was fired and when a selected temperature rise in the temperature of the boiler fluid is detected; and
modifying the heating temperature profile based upon the boiler temperature rise delay.

9. The method of claim 8, wherein if the boiler temperature rise delay exceeds a predetermined maximum delay, shutting off the burner.

10. The method of claim 9, further comprising:
subsequent to shutting off the burner:
determining if the temperature of the boiler fluid decreases faster than a predetermined rate; and
if the temperature of the boiler fluid decreases faster than the predetermined rate:
modifying the heating temperature profile; and
returning the boiler to a ready state, wherein in the ready state, the burner is allowed to fire based on the call for heat or a subsequent call for heat.

11. The method of claim 1, wherein the temperature of the boiler fluid is measured proximate a water outlet of the boiler.

12. The method of claim 11, wherein the temperature of the boiler fluid is measured by a sensor in thermal communication with a water outlet pipe of the boiler.

13. The method of claim 1, wherein the temperature of the boiler fluid is measured via an Aquastat.

14. A method for controlling a boiler configured to provide a heated boiler fluid for heating a space of a building that is to be temperature controlled by the boiler, wherein the boiler including a burner, the method comprising:
receiving a call for heat that is based on an air temperature sensed in the space of the building;
firing the burner based on the call for heat;
while firing the burner, monitoring over time a temperature difference between a first boiler temperature and a second boiler temperature, the first and second boiler temperatures being monitored by sensors at different boiler locations, and if the temperature difference exceeds a selected difference, shutting off the burner, wherein the first and second boiler temperatures are indicative of temperatures of the boiler fluid at different boiler locations; and
monitoring a temperature deviation between the first boiler temperature and a heating temperature profile that represents an expected temperature response of the first boiler temperature over time to the burner firing, and if the temperature deviation exceeds an allowable deviation, shutting off the burner.

15. The method of claim 14, wherein the first boiler temperature is measured proximate a water outlet of the boiler and the second boiler temperature is measured proximate a domestic hot water coil.

16. The method of claim 14, wherein the first boiler temperature is measured proximate a water outlet of the boiler and the second boiler temperature is measured proximate a water return of the boiler, and further comprising modifying the heating temperature profile based upon the difference between the first and second boiler temperatures.

17. A boiler system configured to provide a heated boiler fluid for heating a space of a building that is to be temperature controlled by the boiler, the system comprising:
   a boiler that includes a burner;
   a thermostat disposed in the space of the building to provide one or more calls for heat to regulate the temperature in the space of the building;
   a sensor for sensing a boiler temperature indicative of a temperature of the boiler fluid;
   a controller for controlling firing of the burner based on the one or more calls for heat from the thermostat, the controller configured to compare over time the boiler temperature with a heating temperature profile, and to shut off the burner if a temperature deviation between the boiler temperature and the heating temperature profile exceeds an allowable deviation and to monitor the temperature of the boiler fluid over time subsequent to shutting off the burner; and
   wherein the heating temperature profile reflects an expected temperature response of the boiler temperature over time with the burner firing.

18. The boiler system of claim 17, wherein the controller is further configured to store a boiler performance history, and to dynamically modify the heating temperature profile based upon the stored boiler performance history.

19. The boiler system of claim 17, wherein the controller is further configured to dynamically modify the allowable deviation over time.

20. The method of claim 1, wherein the heating temperature profile further describes an expected temperature response of the boiler temperature over time with the burner not firing.

21. A method for controlling a boiler configured to provide a heated boiler fluid for heating a space of a building that is to be temperature controlled by the boiler, wherein the boiler including a burner, the method comprising:
   receiving a call for heat that is based on an air temperature sensed in the space of the building;
   firing the burner based on the call for heat;
   while firing the burner, monitoring over time a temperature difference between a first boiler temperature and a second boiler temperature, the first boiler temperature being measured proximate a water outlet of the boiler and the second boiler temperature being measured proximate a water return of the boiler;
   if the temperature difference exceeds a threshold, shutting off the burner,
   wherein the first and second boiler temperatures are indicative of the temperature of the boiler fluid proximate a water outlet and proximate a water return, respectively; and
   monitoring a temperature deviation between the first boiler temperature and a heating temperature profile that represents an expected temperature response of the first boiler temperature over time to the burner firing, and if the temperature deviation exceeds an allowable deviation, shutting off the burner.

* * * * *